March 20, 1956 L. E. ERICKSON 2,739,303

DUAL RANGE DIAL

Filed Feb. 4, 1955 2 Sheets-Sheet 1

INVENTOR
LARS E. ERICKSON

BY Pierce, Scheffler & Parker,
ATTORNEYS.

DUAL RANGE DIAL

Filed Feb. 4, 1955 2 Sheets-Sheet 2

INVENTOR
LARS E. ERICKSON

BY Pierce, Scheffler & Parker,
ATTORNEYS.

United States Patent Office 2,739,303

Patented Mar. 20, 1956

2,739,303

DUAL RANGE DIAL

Lars E. Erickson, Boonton, N. J., assignor to Aircraft Radio Corporation, Boonton, N. J., a corporation of New Jersey Application February 4, 1955, Serial No. 486,248

5 Claims. (Cl. 340—282)

This invention relates to a dual range dial for use with apparatus such as radio equipment which is adapted to be adjusted over two graduated ranges.

Errors frequently result in the adjustment of radio equipment which is provided with a tuning dial upon which the numerical values of two ranges are continuously displayed as the operator may look at one set of numeral values when the equipment is adjusted for operation on the other range Objects of the present invention are to provide dual range dials which display only one set of numerical values, at any one time, and only one small area on which an individual's eyes must focus. Objects are to provide dials comprising an outer disk with a series of windows within a set of graduations at its rim for cooperation with a fixed fiducial mark, and an inner disk bearing two sets of numerical values, the inner disk being adjustable angularly with respect to the outer disk to display one or the other of the sets of numerical values through the window openings of the outer disk.

These and other objects and the advantages of the invention will be apparent from the following specification when taken with the accompanying drawings in which.

Figure 1:
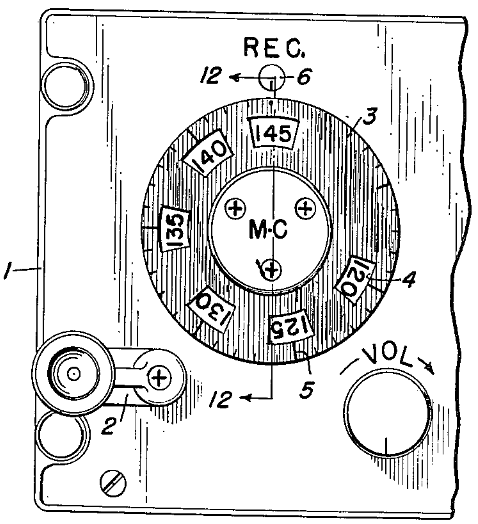
Fig. 1 is a fragmentary front elevation of a piece of radio equipment provided with a dual range tuning dial embodying the invention.
Figures 2, 4:
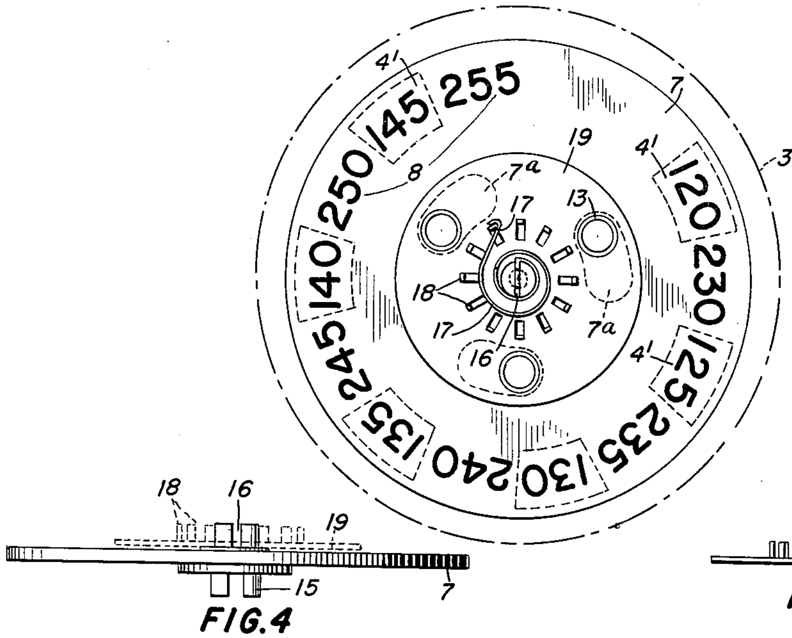
Fig. 2 is an elevation of the tuning dial as seen on removal of the attaching screws and the outer graduated disk.
Fig. 4 is a side elevation of the inner disk and spring anchor, the spring anchor being shown in broken line.
Figure 3:
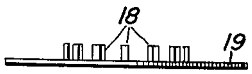
Fig. 3 is a side elevation of the spring anchor of the dial.
Figures 5, 6:
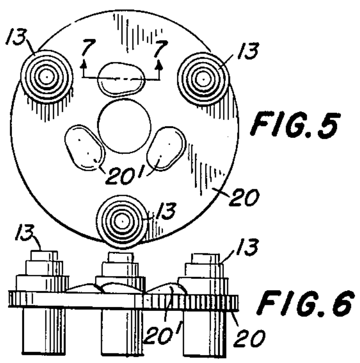
Figs. 5 and 6 are an elevation and side view, respectively, of the outer plate assembly of a rotary mechanism for angular adjustment of the inner disk.
Figure 7:
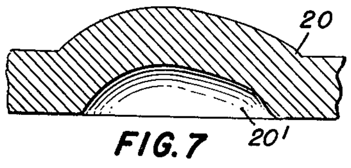
Fig. 7 is a fragmentary sectional view, on a larger scale, on line 7—7 of Fig. 6.

In Fig. 1, the reference numeral 1 identifies the panel of a radio receiver or transmitter control provided with a tuning crank 2 and a tuning dial comprising an outer disk 3 provided with windows 4 located within a graduated circular scale 5 which moves angularly with respect to a fixed fiducial mark on a post 6 when the tuning elements, not shown, are adjusted by rotation of the crank 2. The disk 3 is preferably a molded annulus of transparent plastic, see Fig. 12, with all portions except the windows 4 dyed or painted with some opaque color, as indicated by the surface shading of Fig. 1. The numerical values shown at the windows 4 of disk 3 of Fig. 1 are carried by an inner disk 7, see Fig. 2, in which the relative positions of the outer disk windows are indicated by the broken line blocks 4'. In addition to the set of numerical values displayed in windows 4 of Fig. 1, the inner disk 7 also carries a set of numeral values 8 which alternate with those shown at the windows 4 in Fig. 1, and a rotary mechanism is provided for effecting angular movement of the inner disk 7 with respect to the outer disk 3.

Figures 12, 13:
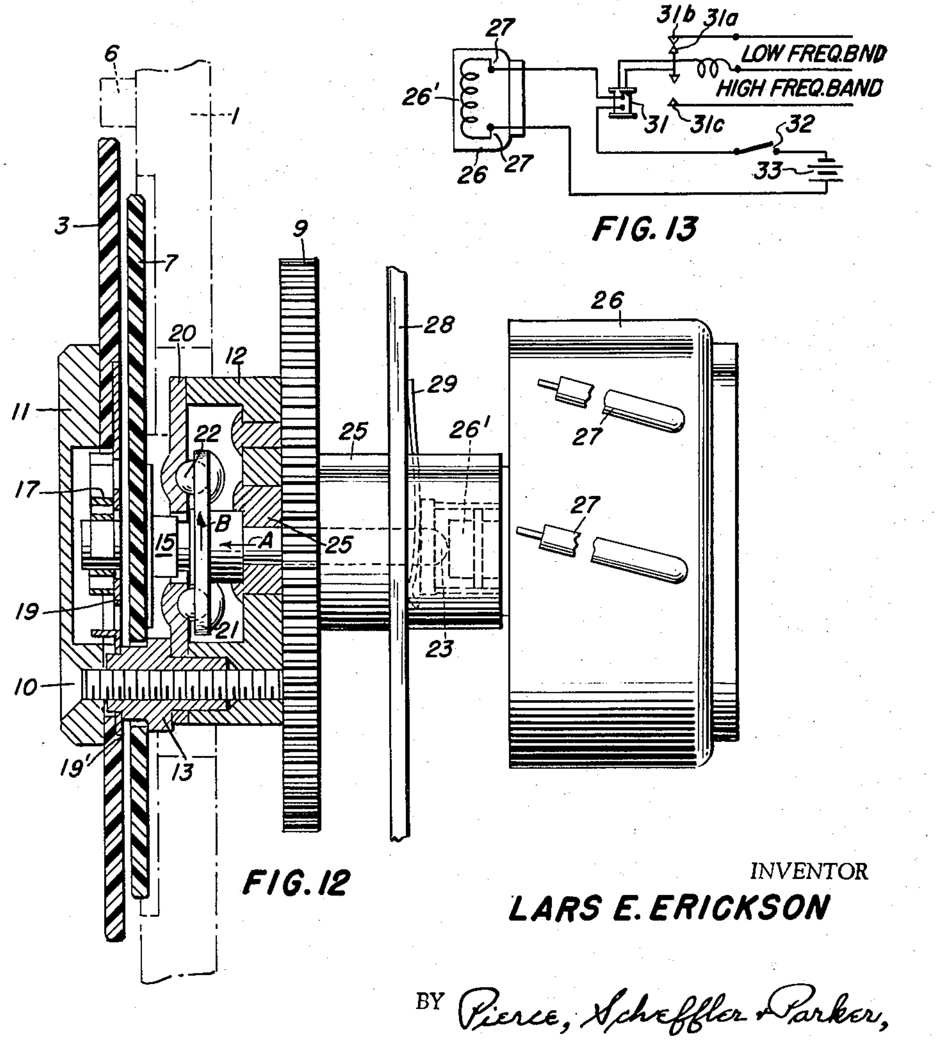
Fig. 12 is a substantially central axial section through the dial assembly taken on plane 12—12 of Fig. 1.
Fig. 13 is a schematic circuit diagram showing the arrangement for changing the indicated range on the tuning dial as the radio apparatus is switched over from one frequency band to another.

The dial assembly is mounted on a gear 9 which is coupled to the tuning crank 2 by gearing, not shown, which rotates the gear and attached dial at a low rate as compared to rotation of the crank 2, see Fig. 12. Screws 10 extend through a cover cap 11, disks 3 and 7, and a hollow box or base 12 to secure the assembly to the gear wheel, it being understood that three screws 10 are provided although only one will be seen in the central section. Stepped spacer sleeves 13 are fitted upon the screws 10 to provide clearance between the disks, and the inner disk 7 is provided with arcuate openings 7a, see Fig. 2, to permit angular movement of that disk with respect to the outer disk 3. Disk 7 is provided with a hub 15 having a slotted outer end 16 for receiving one end of a spiral spring 17, the other spring end being hooked about one of the upstanding lugs 18 of a spring anchor plate 19 that fits snugly within an annular recess 19' at the back of disk 3 and is held against rotation by the sleeves 13 on screws 10.

Figures 8, 9:
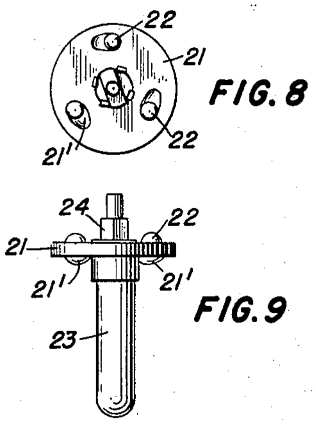
Figs. 8 and 9 are an elevation and a side view, respectively, of the inner movable member of the rotary mechanism.

The outer plates 20 of the rotary mechanism is also held against angular movement by the sleeves 13, and it and the inner movable plate 21 have three sets of complementary grooves 20', 21', respectively, pressed therein in which balls 22 are seated. Inner plate 21 is staked to a cylindrical shaft 23, see Fig. 9, having a non-circular portion 24 which has a sliding fit within the hub 15 of the inner disk 7. The outer plate 20 preferably forms the cover of the box 12 and the hub 25, in which shaft 23 is journalled and axially slidable, extends through a gear 9 and is staked to the bottom of the box. The housing 26 of a solenoid assembly having terminal leads 27 is supported on a subpanel 28 upon which the hub 25 is mounted by a conventional U-shaped spring clip 29.

Figures 10, 11:
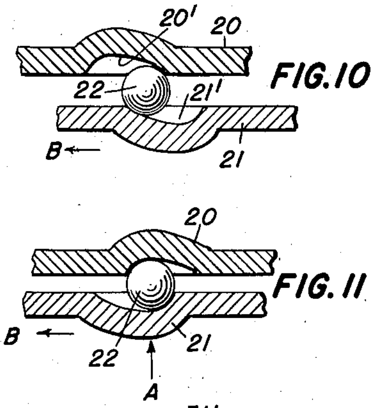
Figs. 10 and 11 are fragmentary sectional views on an enlarged scale showing alternative positions of adjustment of the rotary mechanism plates.

The entire dial assembly and rotary mechanism move as a unit with gear wheel 9, and the spring 17 normally retains the numbered disk 7 at one end of its range of movement as permitted by the slots 7a to display the lower sets of numeral values for graduated scale 5 in the windows 4 of the outer disk. The circuit arrangement for changing the indicated range on the tuning dial as the radio apparatus is switched over from one frequency band to a higher band is shown schematically in Fig. 13. There it will be seen that the solenoid winding 26' is connected in series with the winding of a relay 31 and a control switch 32 to a source of energizing voltage represented by battery 33. Relay 31 includes a movable contact 31a engaged with stationary contact 31b when the the relay winding is deenergized and which thereby closes the transmitting circuit for the low frequency band. When relay 31 is energized, the movable contact 31a breaks its engagement with relay contact 31b opening the low frequency transmitting circuit and shifts over to engage another stationary contact 31c thereby closing the transmitting circuit for the high frequency band. Consequently, when switch 32 is closed to energize the winding of relay 31, solenoid winding 26' is also energized and moves shaft 23 and plate 21 in the direction indicated by arrows A, Figs. 11 and 12. Since plate 20 is anchored against rotary movement, plate 21 can approach plate 20 only by rotating in the direction of arrows B in Figs. 10, 11, and 12. Numbered disk 7 is thus turned angularly against the force of spring 17 to display the other set of numerical values at the windows of the outer disk 3. On again conditioning the apparatus for operation on the lower frequency band by opening switch 32, the solenoid is de-energized and spring 17 returns disk 7 to its original position.

Only one set of numerical values can be seen at any one time, and they are changed automatically with the range change of the radio equipment, thereby avoiding the possibility of error which may arise when the tuning dial continuously displays the numeral values for both operating ranges of a dual range transmitter or receiver.

While the invention is particularly useful with dual range radio equipment, it is to be understood that the dual range dial may be used to indicate the adjustment of other apparatus having two ranges of adjustment.

I claim:

1. An indicating dial for apparatus having an element adjustable angularly to adjust the apparatus over two distinct ranges, said dial comprising an outer disk carrying a graduated scale at its periphery for cooperation with a fixed fiducial mark and provided with windows located within said graduated scale, a second disk carrying a set of numeral values for each range of said apparatus, the respective values for the sets appearing in alternation on said second disk, means including an electromagnetic solenoid for moving said second disk angularly with respect to said first disk to display one or the other of said sets of numerical values at the windows of said first disk, and means connecting said disks to said adjustable element of the apparatus for angular motion therewith.

2. An indicating dial for use with apparatus having an element adjustable angularly to condition the apparatus for operation over two distinct ranges, said dial comprising an outer disk having a peripherally graduated scale for cooperation with a fixed fiducial mark and with windows positioned within said graduated scale, an inner disk positioned back of said first disk and carrying a set of numeral values for each range of said apparatus, screws for securing said outer disk to said adjustable element for angular movement therewith, said inner disk having arcuate openings through which said screws pass to permit limited angular movement of said inner disk with respect to said securing screws and said outer disk, spring means normally retaining said inner disk in position to display one set of numercal values at the windows of said outer disk, and electromagnetic means coaxial with said disks and apparatus element for moving said inner disk angularly against the force of said spring means to display the other set for numerical values at the windows of said outer disk.

3. An indicating dial as recited in claim 2, in combination with spacer sleeves on said screws providing clearance between said disks.

4. An indicating dial as recited in claim 2, wherein said outer disk is annular, and said spring means is located within the central opening of said outer annular disk.

5. An indicating dial as recited in claim 2, in combination with a box secured to said apparatus element by said screws, and wherein said electromagnetic means comprises two relatively movable plates with complementary grooves between which balls are arranged, one of said plates constituting the cover of said box and being movable angularly with said apparatus element and said outer disk, means supporting the other plate in said box for axial and angular movement, said supporting means including a shaft carrying said other plate and having a portion connected to said inner disk for relative sliding but not angular movement, and a solenoid operative on energization thereof to move said shaft axially with respect to said plate constituting the cover of said box, thereby to move said other plate and said inner disk angularly with respect to said outer disk.

References Cited in the file of this patent

UNITED STATES PATENTS

| | | |
|---|---|---|
| 2,098,580 | Harding | Nov. 9, 1937 |
| 2,397,175 | White | Mar. 26, 1946 |
| 2,400,190 | Clark | May 14, 1946 |
| 2,545,922 | Gray | Mar. 20, 1951 |